United States Patent
Ide et al.

(10) Patent No.: US 7,157,876 B2
(45) Date of Patent: *Jan. 2, 2007

(54) MOTOR MAGNETIC POLE POSITION ESTIMATION DEVICE AND CONTROL DEVICE

(75) Inventors: Kozo Ide, Fukuoka (JP); Mitsujiro Sawamura, Fukuoka (JP); Mengesha Mamo Wogari, Fukuoka (JP); Jun Oyama, Nagasaki (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/530,173

(22) PCT Filed: Sep. 25, 2003

(86) PCT No.: PCT/JP03/12283

§ 371 (c)(1),
(2), (4) Date: Apr. 4, 2005

(87) PCT Pub. No.: WO2004/032316

PCT Pub. Date: Apr. 15, 2004

(65) Prior Publication Data

US 2006/0049787 A1    Mar. 9, 2006

(30) Foreign Application Priority Data

Oct. 3, 2002    (JP)    ............................. 2002-291261

(51) Int. Cl.
*H02P 6/18*    (2006.01)

(52) U.S. Cl. .................... 318/439; 318/254; 318/721

(58) Field of Classification Search ................ 318/138, 318/254, 439, 720–724; 388/906, 909
See application file for complete search history.

(56) References Cited

U.S. PATENT DOCUMENTS

| | | | | |
|---|---|---|---|---|
| 5,196,775 A | * | 3/1993 | Harris et al. | ................. 318/638 |
| 6,034,494 A | * | 3/2000 | Kitamine et al. | ............ 318/254 |
| 6,885,310 B1 | * | 4/2005 | Goto et al. | ............. 340/870.31 |
| 2004/0130284 A1 | * | 7/2004 | Lee | ............................ 318/439 |

FOREIGN PATENT DOCUMENTS

| | | |
|---|---|---|
| JP | 2001-238060 A | 8/2001 |
| JP | 2002-78391 A | 3/2002 |
| JP | 2003-52193 A | 2/2003 |

* cited by examiner

*Primary Examiner*—Bentsu Ro
(74) *Attorney, Agent, or Firm*—Sughrue Mion, PLLC

(57) ABSTRACT

It is an object of the invention to provide an apparatus for estimating a magnetic pole position of a motor in which the amplitudes of high-frequency currents can be adjusted.

In the invention, a controlling apparatus for driving a motor (1-1) by a voltage source PWM inverter (1-2), and controlling a torque and speed, or torque, speed, and position of the motor has: means for switching over first means for producing an arbitrary phase difference in PWM carrier signals between respective two phases such as UV, VW, or WU of three or UVW phases, and second means for causing the phase difference between two phases such as V, VW, or WU of three or UVW phases to become zero; means for extracting high-frequency currents in a same frequency band as carrier signals generated by it, from estimated currents; and means (1-4) for estimating a magnetic pole position by using the extracted high-frequency currents.

20 Claims, 6 Drawing Sheets

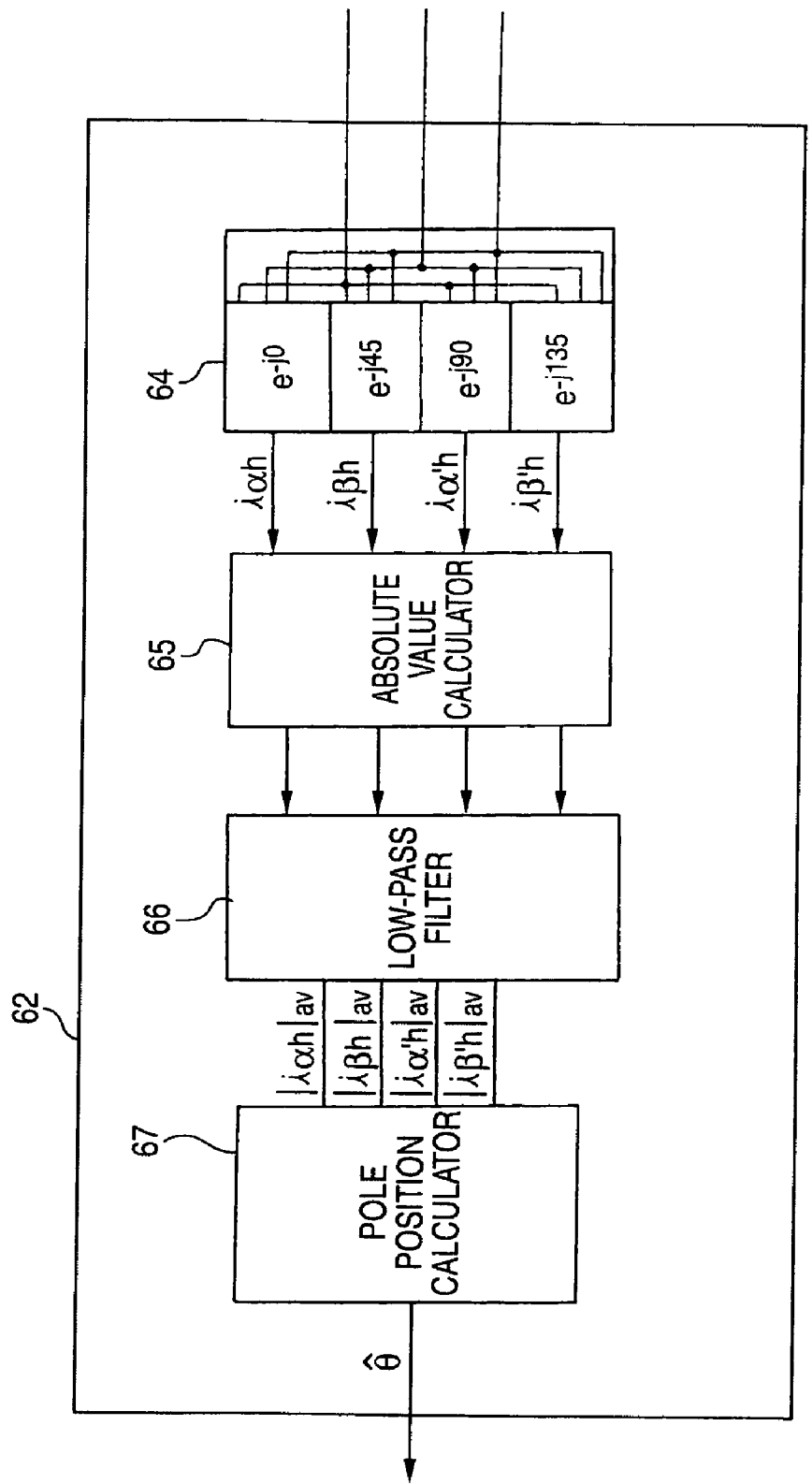

MOTOR MAGNETIC POLE POSITION ESTIMATION DEVICE AND CONTROL DEVICE

TECHNICAL FIELD

The present invention relates to an apparatus for controlling a motor which accurately estimates a magnetic pole position at a very low speed including zero speed, and which controls the torque, the speed, and the position on the basis of the estimated magnetic pole position.

BACKGROUND ART

As a conventional method of estimating a magnetic pole position, widely used is a method in which an induced voltage that is proportional to a motor speed is calculated from a motor input voltage and a current, and the speed is estimated, such as that reported in "Adaptive Current Control Method for Brushless DC motor with Function of Parameter Identification" IEEJ Transactions on Industry Applications, Vol. 108 No. 12, 1988. Also known is "Zero Speed Torque Control of Sensorless Salient-Pole Synchronous Motor" 1996 National Convention of IEEJ Industry Applications Society No. 170. In this technique, an AC signal is superimposed on a voltage command value, and an estimated current is FFT analyzed to estimate the rotational speed of a motor and a magnetic pole position. However, a method which estimates the speed and position of a rotor on the basis of an induced voltage of a motor operates with sufficient accuracy in a high speed region, but cannot perform correct estimation at a very low speed from which little information of the induced voltage is obtained.

Therefore, several methods have been proposed in which an AC signal that has no relation to a driving frequency, and that is used for sensing is injected into a motor, and a rotor position is estimated from relationships between the voltage and the current. However, a special signal generator is necessary in order to inject such a sensing signal, thereby causing a problem in that the control is complicated. Other methods in which a special sensing signal is not injected and a magnetic pole position is estimated by using high frequencies of an inverter output or currents of carrier frequency components are reported in "Position Sensorless IPM Motor Drive System Using Position Estimation Method Based on Saliency" IEEJ Transactions on Industry Applications, Vol. 118 No. 5, 1998, and "Carrier Frequency Component Method for Position Sensorless Control of IPM Motor in Lower Speed Range" IEEJ Transactions on Industry Applications, Vol. 120 No. 2, 2000. The former method is characterized in that an inductance is calculated from high-frequency currents generated by output voltage high frequencies of a PWM inverter, and the position is estimated on the basis of the inductance.

The latter method is characterized in that a phase difference of 120 deg. is produced in PWM inverter carrier signals between two of three or UVW phases to generate voltages and currents of carrier frequency components other than the driving frequency, and the position is estimated by using only the carrier frequency component currents based on the assumption that a voltage during the carrier period is constant.

In IECON' 01 (Proc. of the 27th Annual Conference of the IEEE Industrial Electronics Society pp. 1435–1440) "Novel Rotor Position Extraction based on Carrier Frequency Component Method (CFCM) using Two Reference-frames for IPM drivers", and Patent Reference 1 which is a prior patent application in the name of the same applicant, in order to further facilitate practical use of the latter method, the problem in that synchronization between plural current estimation timings in a carrier period and position calculation is complicated was solved by a method in which, with respect to a high-frequency current converted to four axes, a moving average value is used in each of the axes as described later.

[Patent Reference 1]
Publication of Japanese Patent Application No. 2001-238060

Specifically, FIG. 6 is a block diagram of a conventional apparatus for detecting a magnetic pole position. In the magnetic pole position detector 62, three-phase high-frequency currents output from a band-pass filter are converted by a coordinate converter 64 to the $\alpha$-axis, the $\beta$-axis, the $\alpha'$-axis, and the $\beta'$-axis. Peak values of the four converted outputs are averaged by an absolute value calculator 65 and a low-pass filter 66. On the bases of proportional relationships with inductances of the axes, a pole position calculator 67 calculates $\tan(2\Delta\theta)$ to obtain $\Delta\theta$, thereby calculating the magnetic pole position.

DISCLOSURE OF THE INVENTION

In the conventional technique, however, the methods which estimate a magnetic pole position by using harmonics of an inverter output high frequency or high-frequency currents of carrier frequency components have a feature that, although high-frequency currents caused by high-frequency voltages disturb the voltage of the fundamental harmonic component of the inverter output, the carrier frequency is sufficiently higher than the rotational speed of a motor, and hence the high-frequency currents do not generate a torque disturbance. The methods have an advantage that the pole position estimation does not involve restrictions such as addition of a low-pass filter to a current feedback value, and also fast response of the control system is enabled. From the viewpoint of practical use, however, there is a problem in that the levels of high-frequency currents depend on parameters of motors, and hence the influence is not uniform according to motors, thereby causing the methods to be hardly applied to a general-purpose system.

Therefore, it is an object of the invention to provide an apparatus for estimating a magnetic pole position of a motor, and a controlling apparatus in which three-phase carriers having an arbitrary phase difference between phases in a PWM output are switched to a single-phase carrier, and a time period of implementing magnetic pole estimation is adjusted to enable the amplitudes of high-frequency currents to be adjusted, thereby enabling application to a general-purpose system.

In order to attain the object, the invention of claim 1 is an apparatus for estimating a magnetic pole position of a motor for a controlling apparatus for driving a motor by a voltage source PWM inverter, and controlling a torque, torque and speed, or torque, speed, and position of the motor, wherein the apparatus comprises: means for switching over means 1 for producing an arbitrary phase difference in PWM carrier signals between respective two phases such as UV, VW, or WU of three or UVW phases, and means 2 for causing the phase difference between two phases such as UV, VW, or WU of three or UVW phases to become zero; means for extracting high-frequency currents in a same frequency band as carrier signals generated by it, from estimated currents; and means for estimating a magnetic pole position by using the extracted high-frequency currents.

The invention of claim 2 is characterized in that, in the apparatus for estimating a magnetic pole position of a motor according to claim 1, the means for estimating a magnetic pole position by using the extracted high-frequency currents comprises: means for extracting the high-frequency currents from respective phase currents of the three phases of the motor; means for converting the high-frequency currents to two-phase currents in a two-phase stationary coordinate system in which one of three-phase stator windings UVW is α-axis and an axis intersecting the axis at 90 deg. is β-axis; means for converting the high-frequency currents to two-phase currents in a two-phase stationary coordinate system in which a phase is similarly shifted by 45 deg. from the two-phase stationary coordinate system, or in which an axis that is shifted by 45 deg. from the α-axis is α'-axis and an axis intersecting the axis at 90 deg. is β'-axis; and means for averaging the high-frequency currents in the four axes with a carrier frequency to calculate respective maximum values, and estimates the magnetic pole position on a basis of the calculated maximum values in the four axes.

The invention of claim 3 is characterized in that, in the apparatus for estimating a magnetic pole position of a motor according to claim 1, the means for estimating a magnetic pole position by using the extracted high-frequency currents comprises: means for extracting the high-frequency currents from respective phase currents of the phases of the motor; means for converting the high-frequency currents to two-phase currents in a two-phase stationary coordinate system in which one of three-phase stator windings UVW is α-axis and an axis intersecting the axis at 90 deg. is β-axis; means for conducting conversion from the two-phase currents by using a magnetic pole estimated value in a two-phase rotating coordinate system in which γ-axis is in a same direction as the magnetic pole position, and an axis intersecting the axis at 90 deg. is δ-axis; means for converting the high-frequency currents to two-phase currents in a coordinate system in which a phase is similarly shifted by 45 deg. from the two-phase rotating coordinate system, i.e., a two-phase rotating coordinate system in which an axis that is shifted by 45 deg. from the γ-axis is γ'-axis and an axis intersecting the axis at 90 deg. is δ'-axis; and means for averaging the high-frequency currents in the four axes with a carrier frequency to calculate respective maximum values, and estimates the magnetic pole position on a basis of the calculated maximum values in the four axes.

The invention of claim 4 is characterized in that, in the apparatus for estimating a magnetic pole position of a motor according to claim 1, at least two or more currents are estimated during one carrier period.

The invention of claim 5 is characterized in that, in the apparatus for estimating a magnetic pole position of a motor according to claim 1, the arbitrary phase difference is 120 deg.

The invention of claim 6 is characterized in that, in the apparatus for estimating a magnetic pole position of a motor according to claim 1, implementing time periods of the means 1 and the means 2 in the means for switching over the means 1 for producing an arbitrary phase difference in PWM carrier signals between respective two phases such as UV, VW, or WU of three or UVW phases, and the means 2 for causing the phase difference between two phases such as UV, VW, or WU of three or UVW phases to become zero are set for purposes of adjusting amplitudes of generated high-frequency currents, and reducing a power loss.

The invention of claim 7 is characterized in that, in the apparatus for estimating a magnetic pole position of a motor according to claim 1, the means for switching over the means 1 for producing an arbitrary phase difference in PWM carrier signals between respective two phases such as UV, VW, or WU of three or UVW phases, and the means 2 for causing the phase difference between two phases such as UV, VW, or WU of three or UVW phases to become zero comprises means for adjusting implementing time periods of the means 1 and the means 2 in accordance with a state of a load.

The invention of claim 8 is characterized in that, in the apparatus for estimating a magnetic pole position of a motor according to claim 2, the means for estimating a magnetic pole position by using the extracted high-frequency currents is executed during an implementing time period of the means 1 for producing an arbitrary phase difference in the PWM carrier signals between respective two phases such as UV, VW, or WU of three or UVW phases is implemented, and, during an implementing time period of the means 2 for causing the phase difference between two phases such as UV, VW, or WU of three or UVW phases to become zero, is stopped, and uses a magnetic pole position estimated by the means 1.

The invention of claim 9 is characterized in that, in the apparatus for estimating a magnetic pole position of a motor according to claim 2, the means for estimating a magnetic pole position by using the extracted high-frequency currents is always implemented irrespective of implementing time periods of the means 1 for producing an arbitrary phase difference in the PWM carrier signals between respective two phases such as UV, VW, or WU of three or UVW phases, and the means 2 for causing the phase difference between two phases such as UV, VW, or WU of three or UVW phases to become zero, comprises means for moving averaging the high-frequency currents in the four axes with a carrier frequency to calculate respective maximum values, and estimates the magnetic pole position on the basis of the calculated maximum values in the four axes.

The invention of claim 10 is characterized in that, in the apparatus for estimating a magnetic pole position of a motor according to claim 2, the high-frequency currents of the α'- and β'-axes are calculated from the high-frequency currents of the α- and β-axes.

The invention of claim 11 is characterized in that, in the apparatus for estimating a magnetic pole position of a motor according to claim 3, the means for estimating a magnetic pole position by using the extracted high-frequency currents is executed during an implementing time period of the means 1 for producing an arbitrary phase difference in PWM carrier signals between respective two phases such as UV, VW, or WU of three or UVW phases is implemented, and, during an implementing time period of the means 2 for causing the phase difference between two phases such as UV, VW, or WU of three or UVW phases to become zero, is stopped, and uses a magnetic pole position estimated by the means 1.

The invention of claim 12 is characterized in that, in the apparatus for estimating a magnetic pole position of a motor according to claim 3, the means for estimating a magnetic pole position by using the extracted high-frequency currents is always implemented irrespective of implementing time periods of the means 1 for producing an arbitrary phase difference in the PWM carrier signals between respective two phases such as UV, VW, or WU of three or UVW phases, and the means 2 for causing the phase difference between two phases such as UV, VW, or WU of three or UVW phases to become zero, comprises means for moving averaging the high-frequency currents in the four axes with a carrier frequency to calculate respective maximum values, and estimates the magnetic pole position on the basis of the calculated maximum values in the four axes.

The invention of claim 13 is characterized in that, in the apparatus for estimating a magnetic pole position of a motor according to claim 3, the high-frequency currents of the $\gamma'$- and $\delta'$-axes are calculated from the high-frequency currents of the $\gamma$- and $\delta$-axes.

The invention of claim 14 is characterized in that an estimated current is split into a pole direction component and a torque component by using the magnetic pole position estimated by the apparatus for estimating a magnetic pole position according to claim 1, the components are fed back to obtain differences between the pole direction component and the torque component, and current command values, and a current control is implemented so that the differences become zero.

The invention of claim 15 is characterized in that a speed is estimated by using the magnetic pole position estimated by the apparatus for estimating a magnetic pole position according to claim 1.

The invention of claim 16 is characterized in that the speed estimated on the basis of the speed estimating apparatus according to claim 15 is fed back to obtain a difference with respect to a speed command value, and a speed control is implemented so that the difference becomes zero.

The invention of claim 17 is characterized in that a rotor position estimated value which is obtained on the basis of the magnetic pole position estimated by the apparatus for estimating a magnetic pole position according to claim 1 is fed back to obtain a difference with respect to a rotor position command value, and a position control is implemented so that the difference becomes zero.

The invention of claim 18 is characterized in that the invention comprises the apparatus for estimating a magnetic pole position according to claim 1, and a current controlling apparatus according to claim 14.

The invention of claim 19 is characterized in that the invention comprises the apparatus for estimating a magnetic pole position according to claim 1, a current controlling apparatus according to claim 14, a speed estimating apparatus according to claim 15, and a speed controlling apparatus according to claim 16.

The invention of claim 20 is characterized in that the invention comprises the apparatus for estimating a magnetic pole position according to claim 1, a current controlling apparatus according to claim 14, a speed estimating apparatus according to claim 15, a speed controlling apparatus according to claim 16, and a position controlling apparatus according to claim 17.

BRIEF DESCRIPTION OF THE DRAWINGS

FIG. 6 is a block diagram of a conventional apparatus for estimating a magnetic pole position.

Figure 1:
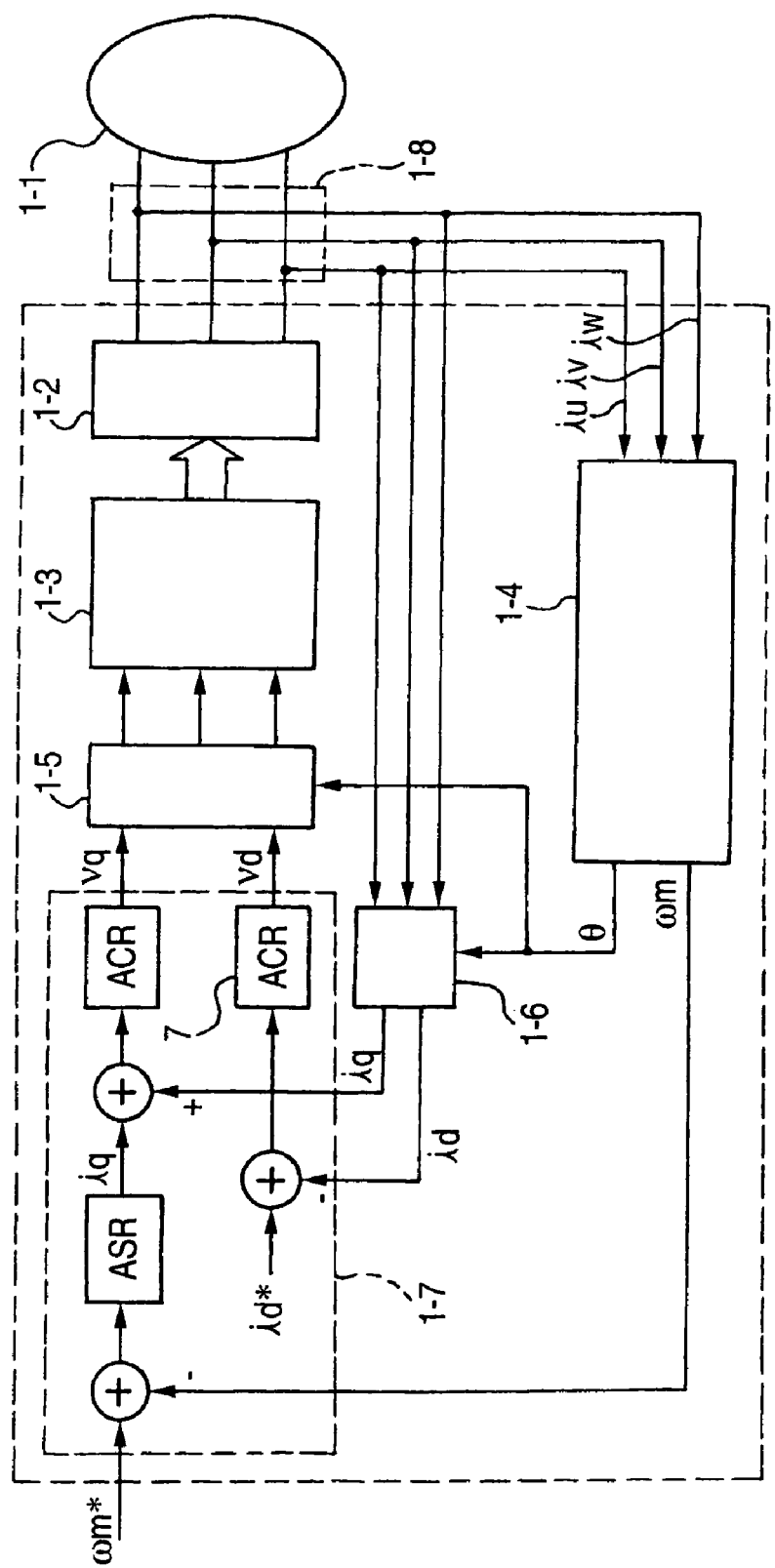
FIG. 1 is a block diagram of a sensorless speed controlling apparatus including the apparatus for estimating a magnetic pole position of a motor of the invention.

In the figures, the reference numerals denote as follows:

| | |
|---|---|
| 1-1 | motor, |
| 1-2 | voltage source inverter, |
| 1-3 | PWM signal generating apparatus, |
| 1-4 | magnetic pole position/speed estimating apparatus, |
| 1-5, 1-6 | two to three-phase converter, |
| 1-7 | current controller, speed controller, |
| 1-8 | current detector, |
| 1-3-1 | carrier signal generator, |
| 1-3-2 | phase shifter, |
| 1-3-3 | timer, |
| 1-3-4 | changeover switch, |
| 1-4-1 | band-pass filter, |
| 1-4-2 | current coordinate converter, |
| 1-4-3 | average calculator, |
| 1-4-4, 1-4-6 | low-pass filter, |
| 1-4-5 | differentiator. |

BEST MODE FOR CARRYING OUT THE INVENTION

Hereinafter, an embodiment of the invention will be described with reference to the drawings.

FIG. 1 is a block diagram of a sensorless speed controlling apparatus including the apparatus for estimating a magnetic pole position of a motor of an embodiment of the invention.

Figure 2:
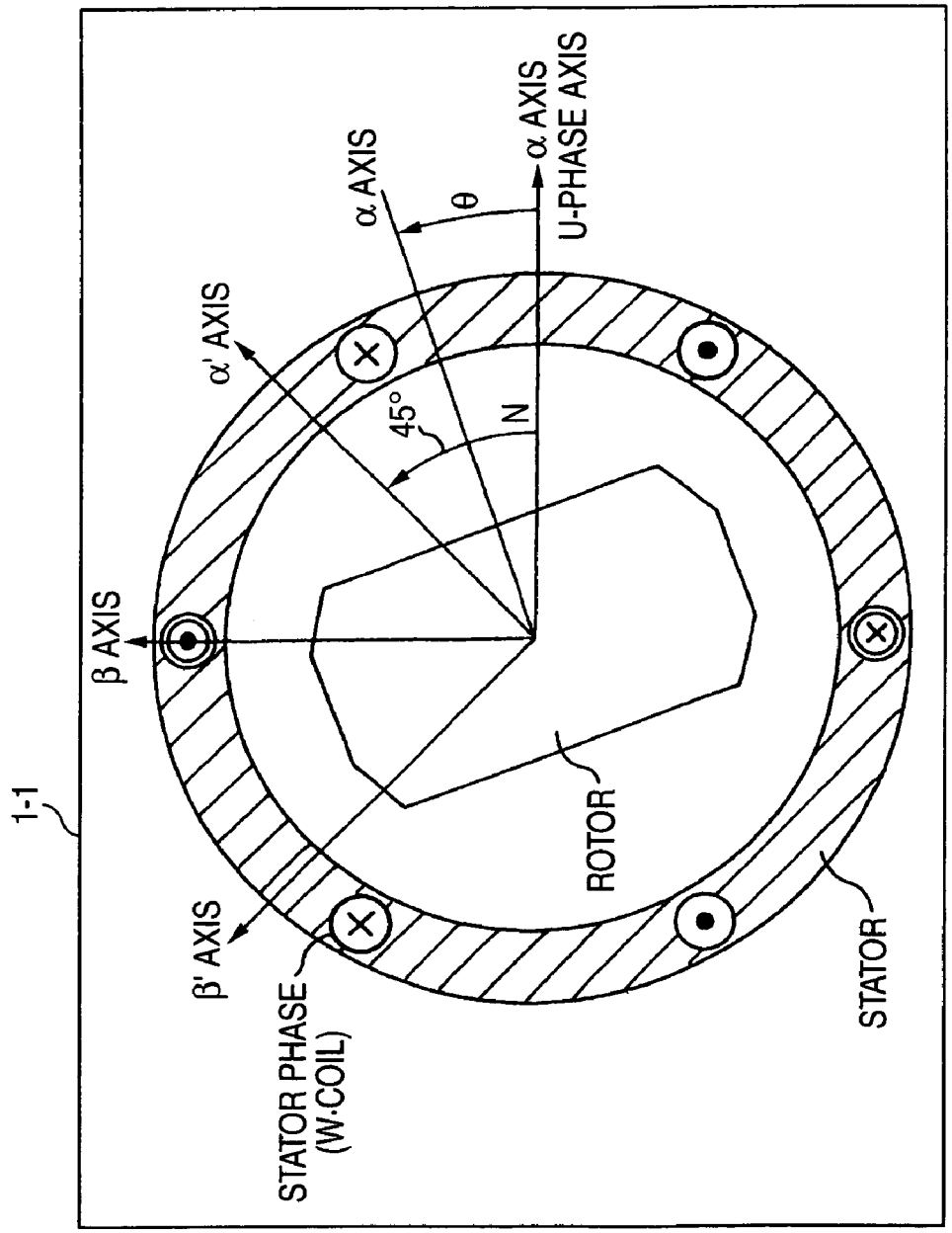
FIG. 2 is a model of a synchronous motor incorporating a permanent magnet shown in FIG. 1.

FIG. 2 is a model of a synchronous motor incorporating a permanent magnet shown in FIG. 1.

Figure 3:
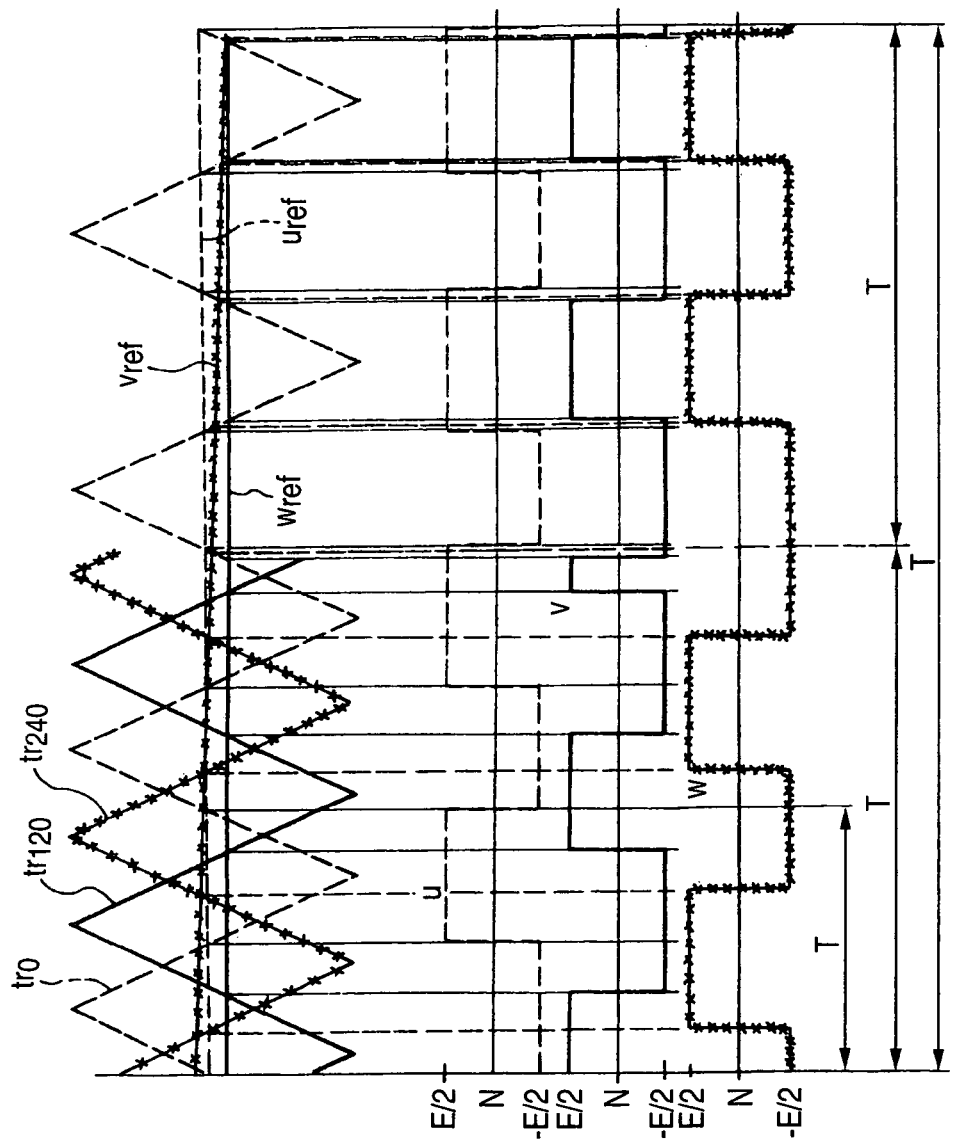
FIG. 3 is a waveform chart illustrating adjustment of an implementing time period in the apparatus for estimating a magnetic pole position shown in FIG. 1.

FIG. 3 is a waveform chart illustrating adjustment of an implementing time period in the apparatus for estimating a magnetic pole position shown in FIG. 1.

Figure 4:
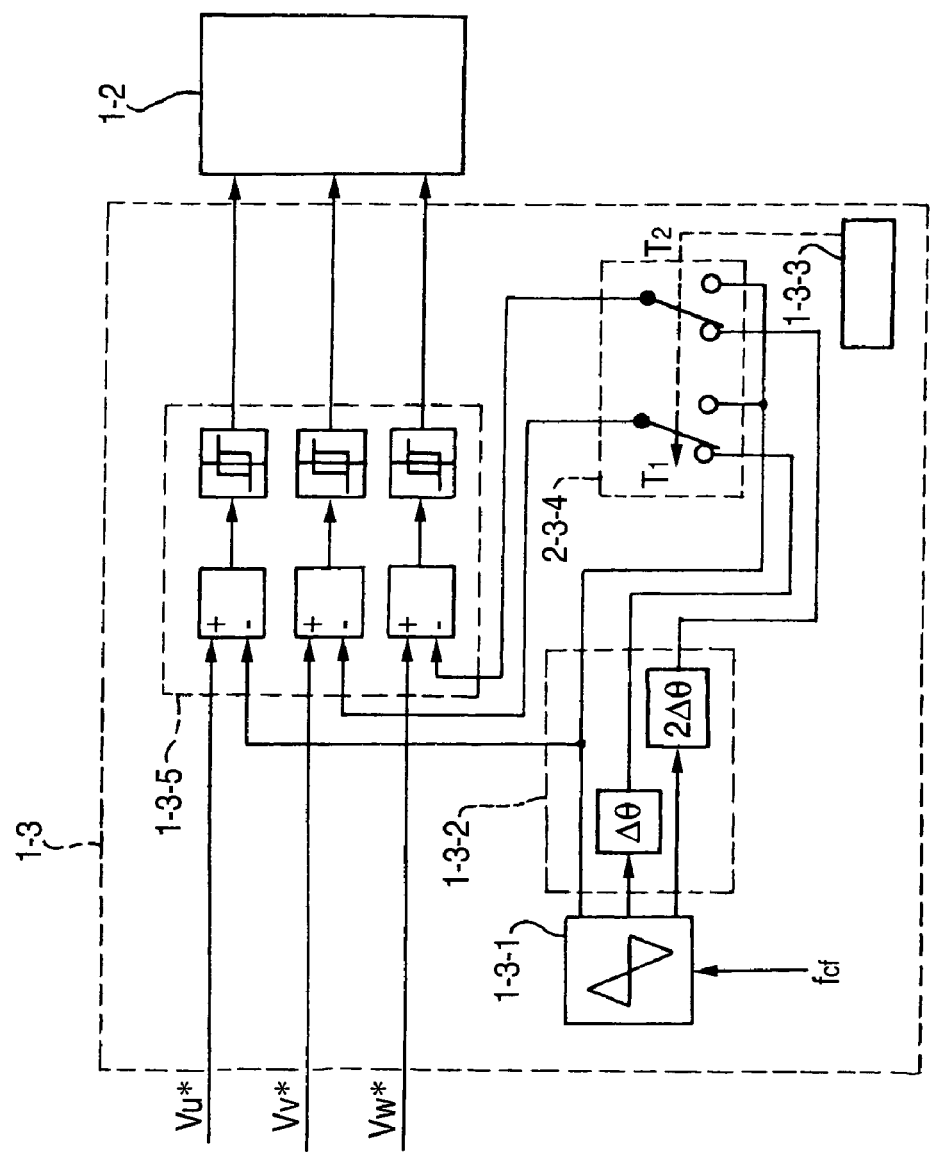
FIG. 4 is a block diagram of a PWM signal generating apparatus shown in FIG. 1.

FIG. 4 is a block diagram of a PWM signal generating apparatus shown in FIG. 1.

Figure 5:
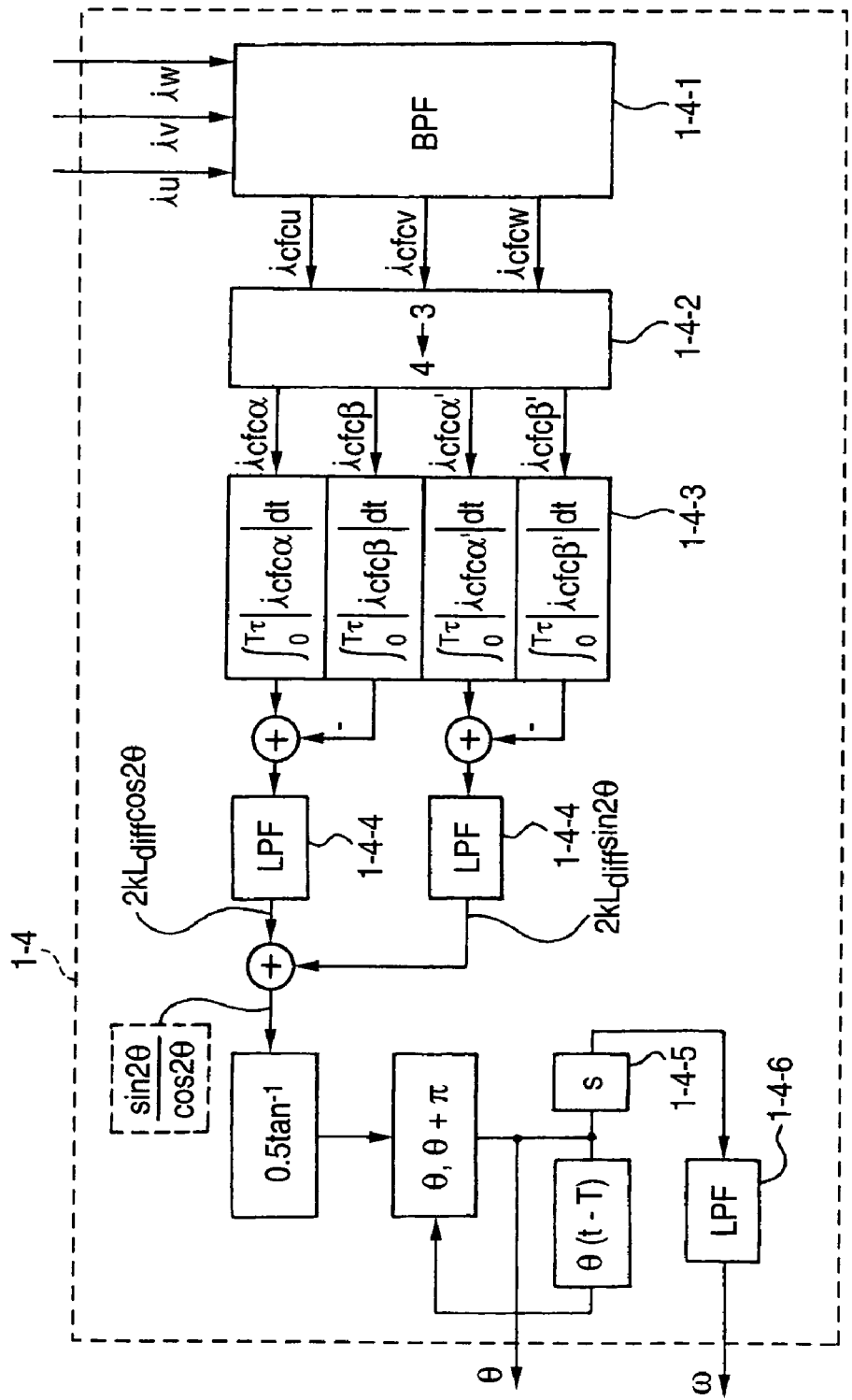
FIG. 5 is a block diagram of a magnetic pole position/speed estimating apparatus shown in FIG. 1.

FIG. 5 is a block diagram of a magnetic pole position/speed estimating apparatus shown in FIG. 1.

In FIG. 1, 1-1 denotes a motor incorporating a permanent magnet, 1-2 denotes a voltage source inverter, 1-3 denotes a PWM signal generating apparatus, 1-4 denotes a magnetic pole position/speed estimating apparatus, 1-5 and 1-6 denote two to three-phase converters, 1-7 denotes a current controller and a speed controller, and 1-8 denotes a current detector.

The current controller and the speed controller denoted by 1-7 are configured by a conventional control method such as the proportional integral (PI) or proportional integral differential (PID) control. In the magnetic pole position/speed estimating apparatus 1-4, a current detected by the current detector 1-8 is digitized by an A/D converter and then input. An output of the magnetic pole position estimating apparatus 1-4 is used as magnetic pole and speed estimated values in respective controls.

In the PWM signal generating apparatus 1-3, the triangular wave comparison PWM control is used. Three-phase sinusoidal voltage command values and triangular wave carrier signals (carrier waves) having an arbitrary frequency are compared with each other by 1-3-5 in FIG. 4. If the voltage command is larger than the carrier wave, a signal which causes positive-side transistors of a PWM inverter to be turned ON, and negative-side transistors to be turned OFF is generated. If the voltage command is smaller than the carrier wave, a signal which causes the positive-side transistors of the PWM inverter to be turned OFF, and the negative-side transistors to be turned ON is generated. In usual triangular wave modulation, the amplitude, phase, and frequency of the carrier wave are constant in all the phases.

However, a sensorless control using carrier frequency components is conducted in the following manner. In the conventional invention, an arbitrary phase difference (in the embodiment, 120 deg. is set) is produced in carrier signals between respective two phases such as UV, VW, or WU of three or UVW phases. In the invention, means for switching over means 1 for producing an arbitrary phase difference in carrier signals between respective two phases such as UV, VW, or WU of three or UVW phases, and means 2 for causing the phase difference between two phases such as UV, VW, or WU of three or UVW phases to become zero is used. The detail will be described with reference to FIGS. 3 and 4.

FIG. 2 is a model of a synchronous motor incorporating a permanent magnet. A two-phase stationary coordinate system in which the U-phase of the three phases of the motor is α-axis and an axis intersecting the axis at 90 deg. is β-axis is defined, and a two-phase stationary coordinate system in which an axis that is shifted by 45 deg. from the α-axis is α'-axis and an axis intersecting the axis at 90 deg. is β'-axis is defined. The magnetic pole position can be estimated on the basis of maximum values which are obtained by moving averaging high-frequency currents in the four axes with a carrier frequency, and calculating respective maximum values.

FIG. 3 illustrates the means for switching over the means 1 (T1 zone) for producing an arbitrary phase difference in the carrier signals between respective two phases such as UV, VW, or WU of the three or UVW phases, and the means 2 (T2 zone) for causing the phase difference between two phases such as UV, VW, or WU of the three or UVW phases to become zero. In the figure, Tc indicates the period of the carrier waves, and T indicates the period of the switching.

First, the magnetic pole position estimation in the T1 zone will be described.

FIG. 4 is a view illustrating the PWM signal generating apparatus 1-3 which generates an output command signal for the voltage source inverter. In a signal output from a carrier signal generator 1-3-1, the phase shifter 1-3-2 produces an arbitrary phase difference between respective two phases such as UV, VW, or WU of the three or UVW phases. In the T1 zone, a changeover switch 1-3-4 sets a T1 side to be turned ON, and a T2 side to be turned OFF. T1 or T2 is counted by a timer 1-3-3. As an example, it is assumed that the arbitrary phase difference in the T1 zone is 120 deg. Then, the carrier waves are tr0, tr120, tr240 shown in FIG. 3, and high-frequency voltage components included between output terminals of the inverter can be expressed by following expression 1:

$$\begin{bmatrix} u_{cfcu} \\ u_{cfcv} \\ u_{cfcw} \end{bmatrix} = \begin{bmatrix} -\frac{2E}{\pi}\cos\left(\frac{\pi u_{ref}}{2E}\right)\sin(\omega_h t) \\ -\frac{2E}{\pi}\cos\left(\frac{\pi v_{ref}}{2E}\right)\sin(\omega_h t - 120°) \\ -\frac{2E}{\pi}\cos\left(\frac{\pi w_{ref}}{2E}\right)\sin(\omega_h t + 120°) \end{bmatrix} \quad (1)$$

where E indicates the dc link voltage, $u_{chcu}$, $u_{chcv}$, $u_{chcw}$ indicate high-frequency voltages of the U-, V-, and W-phases, respectively, $u_{ref}$, $v_{ref}$, $w_{ref}$ indicate phase voltage command values, and $\omega_h$ indicates a carrier angular frequency.

On the contrary, relationships between the high-frequency voltages and the high-frequency currents are expressed by following expression (2):

$$\begin{bmatrix} u_{cfcu} \\ u_{cfcv} \\ u_{cfcw} \end{bmatrix} = \begin{bmatrix} L_{uu} & L_{uv} & L_{vw} \\ L_{vu} & L_{vv} & L_{vw} \\ L_{wu} & L_{wv} & L_{ww} \end{bmatrix} \frac{d}{dt} \begin{bmatrix} i_{cfcu} \\ i_{cfcv} \\ i_{cfcw} \end{bmatrix} \quad (2)$$

where $i_{cfcu}$, $i_{cfcv}$, and $i_{cfcw}$ indicate high-frequency currents of the U-, V-, and W-phases, respectively, L indicates an inductance, $L_{uu}$, $L_{vv}$, and $L_{ww}$ indicate self inductances of the U-, V-, and W-phases, respectively, and the others indicate phase-to-phase inductances.

In the example, the motor in which a permanent magnet is incorporated in a rotor has electric salient poles. Therefore, the inductances contain information of a magnetic pole position θ as shown in following expression (3):

$$L_{uv} = -L_{g0}/2 - L_{g2}\cos(2\theta - 120°)$$

$$L_{vw} = -L_{g0}/2 - L_{g2}\cos(2\theta)$$

$$L_{uw} = -L_{g0}/2 - L_{g2}\cos(2\theta + 120°)$$

$$L_{uu} = L_s + L_{g0} - L_{g2}\cos(2\theta) \quad (3)$$

$$L_{vv} = L_s + L_{g0} - L_{g2}\cos(2\theta + 120°)$$

$$L_{ww} = L_s + L_{g0} - L_{g2}\cos(2\theta - 120°)$$

where $L_{g0}$ indicates the magnetizing inductance in the air gap flux, $L_s$ indicates the leakage inductance of a stator, and $L_{g2}$ indicates an inductance the degree of which depends on the angle.

When expression (2) is converted to a stator-based stationary coordinate system, $$\begin{bmatrix} u_{cfc\alpha} \\ u_{cfc\beta} \end{bmatrix} = \begin{bmatrix} L_{sum} + L_{diff}\cos(2\theta) & L_{diff}\sin(2\theta) \\ L_{diff}\sin(2\theta) & L_{sum} - L_{diff}\cos(2\theta) \end{bmatrix} \frac{d}{dt}\begin{bmatrix} i_{cfc\alpha} \\ i_{cfc\beta} \end{bmatrix} \quad (4)$$

where $L_{sum} = L_s + 3L_{g0}/2$, and $L_{diff} = 3L_{g2}/2$.

From expression (4), current differentiation values are obtained as shown in expression (5). When both sides are integrated, expression (6) is obtained.

$$\frac{d}{dt}\begin{bmatrix} i_{cfc\alpha} \\ i_{cfc\beta} \end{bmatrix} = \quad (5)$$

$$\frac{1}{L_{sum}^2 - L_{diff}^2} \begin{bmatrix} L_{sum} - L_{diff}\cos(2\theta) & -L_{diff}\sin(2\theta) \\ -L_{diff}\sin(2\theta) & L_{sum} + L_{diff}\cos(2\theta) \end{bmatrix} \begin{bmatrix} u_{cfc\alpha} \\ u_{cfc\beta} \end{bmatrix}$$

$$\begin{bmatrix} i_{cfc\alpha} \\ i_{cfc\beta} \end{bmatrix} = \quad (6)$$

$$\frac{1}{L_{sum}^2 - L_{diff}^2} \begin{bmatrix} L_{sum} - L_{diff}\cos(2\theta) & -L_{diff}\sin(2\theta) \\ -L_{diff}\sin(2\theta) & L_{sum} + L_{diff}\cos(2\theta) \end{bmatrix} \begin{bmatrix} \int u_{cfc\alpha}\,dt \\ \int u_{cfc\beta}\,dt \end{bmatrix}$$

From expression (6), the magnetic pole position information sin (2θ) and cos (2θ) are derived:

$$\begin{bmatrix} \cos(2\theta) \\ \sin(2\theta) \end{bmatrix} = \qquad (7)$$

$$\frac{1}{L_{diff}\left(\left(\int u_{cfc\alpha}\,dt\right)^2 + \left(\int u_{cfc\beta}\,dt\right)^2\right)} \begin{bmatrix} L_{sum}\left(\left(\int u_{cfc\alpha}\,dt\right)^2 - \left(\int u_{cfc\beta}\,dt\right)^2\right) - (L_{sum}^2 - L_{diff}^2)\left(i_{cfc\alpha}\int u_{cfc\alpha}\,dt - i_{cfc\beta}\int u_{cfc\beta}\,dt\right) \\ 2L_{sum}\int u_{cfc\alpha}\,dt \int u_{cfc\beta}\,dt - (L_{sum}^2 - L_{diff}^2)\left(i_{cfc\alpha}\int u_{cfc\beta}\,dt + i_{cfc\beta}\int u_{cfc\alpha}\,dt\right) \end{bmatrix}$$

In the case where the amplitudes of the voltage command values are low in a low speed region, and the sampling period is shorter than the carrier period, the voltage integration value can be dealt as a fixed value as in following expression (8):

$$\int u_{cfc\alpha}\,dt = u_{cfc\alpha}\Delta t, \quad \int u_{cfc\beta}\,dt = u_{cfc\beta}\Delta t \qquad (8)$$

Δt: sampling time

When $u_{\alpha h}$ is a peak voltage, $u_{\beta h}=0$. At this timing, therefore, cos (2θ) is calculated from expression (9) as follow:

$$\cos(2\theta) = \frac{L_{sum}}{L_{diff}} - \frac{(L_{sum}^2 - L_{diff}^2)}{L_{diff}} \cdot \frac{i_{cfc\alpha}}{u_{cfc\alpha} \cdot \Delta t} \qquad (9)$$

When $u_{\beta h}$ is a peak voltage, $u_{\alpha h}=0$. At this timing, therefore, cos (2θ) is calculated from expression (9) as follow:

$$\cos(2\theta) = -\frac{L_{sum}}{L_{diff}} + \frac{(L_{sum}^2 - L_{diff}^2)}{L_{diff}} \cdot \frac{i_{cfc\beta}}{u_{cfc\beta} \cdot \Delta t} \qquad (10)$$

At the point where θ is advanced by 45 deg. from the point of $u_{\alpha h}=0$, $u_{\alpha h}=u_{\beta h}$. At this timing, therefore, sin (2θ) is calculated from expression (9) as follow:

$$\sin(2\theta) = \frac{L_{sum}}{L_{diff}} - \frac{(L_{sum}^2 - L_{diff}^2)}{L_{diff}} \cdot \frac{i_{cfc\alpha} + i_{cfc\beta}}{(u_{cfc\alpha} + u_{cfc\beta}) \cdot \Delta t} \qquad (11)$$

At the point where θ is advanced by 135 deg. from the point of $u_{\alpha h}=0$, $u_{\alpha h}=-u_{\beta h}$. At this timing, therefore, sin (2θ) is calculated from expression (9) as follow:

$$\sin(2\theta) = -\frac{L_{sum}}{L_{diff}} + \frac{(L_{sum}^2 - L_{diff}^2)}{L_{diff}} \cdot \frac{i_{cfc\alpha} - i_{cfc\beta}}{(u_{cfc\alpha} + u_{cfc\beta}) \cdot \Delta t} \qquad (12)$$

As a result, it is possible to detect the position of the magnetic pole.

As shown in FIG. 2, a two-phase stationary coordinate system in which a point where θ is advanced by 45 deg. from the α-axis is α'-axis and an axis intersecting the axis at 90 deg. is β'-axis is defined, and high-frequency currents and voltage components in the axes are defined as shown in following expression (13):

$$\begin{bmatrix} i'_{cfc\alpha} \\ i'_{cfc\beta} \end{bmatrix} = \begin{bmatrix} \cos 45° & \sin 45° \\ -\sin 45° & \cos 45° \end{bmatrix} \begin{bmatrix} i_{cfc\alpha} \\ i_{cfc\beta} \end{bmatrix} = \frac{1}{\sqrt{2}} \begin{bmatrix} i_{cfc\alpha} + i_{cfc\beta} \\ -i_{cfc\alpha} + i_{cfc\beta} \end{bmatrix} \qquad (13)$$

$$\begin{bmatrix} u'_{cfc\alpha} \\ u'_{cfc\beta} \end{bmatrix} = \begin{bmatrix} \cos 45° & \sin 45° \\ -\sin 45° & \cos 45° \end{bmatrix} \begin{bmatrix} u_{cfc\alpha} \\ u_{cfc\beta} \end{bmatrix} = \frac{1}{\sqrt{2}} \begin{bmatrix} u_{cfc\alpha} + u_{cfc\beta} \\ -u_{cfc\alpha} + u_{cfc\beta} \end{bmatrix}$$

Considering that the current components in the states of expressions (9) to (12) are shifted by a power factor angle Δϕ from the respective peak values as expressed by $|i_{cfc\alpha}|_{peak}$, $|i_{cfc\beta}|_{peak}$, $|i_{cfc\alpha}'|_{peak}$, and $|i_{cfc\beta}'|_{peak}$, the current components are defined as shown in expression (14):

$$u_{cfc\alpha\_peak}:|i_{cfc\alpha}| = |i_{cfc\alpha}|_{peak}\cos(\Delta\phi) \qquad (14)$$

$$u_{cfc\beta\_peak}:|i_{cfc\beta}| = |i_{cfc\beta}|_{peak}\cos(\Delta\phi)$$

$$u'_{cfc\alpha\_peak}:|i'_{cfc\alpha}| = |i'_{cfc\alpha}|_{peak}\cos(\Delta\phi)$$

$$u'_{cfc\beta\_peak}:|i'_{cfc\beta}| = |i'_{cfc\beta}|_{peak}\cos(\Delta\phi)$$

At this time, the peak values of the high-frequency voltages in the respective axes are as follows:

$$|u_{cfc\alpha}|_{peak}=|u_{cfc\beta}|_{peak}=|u_{cfc\alpha}'|_{peak}=|u_{cfc\beta}'|_{peak} \qquad (15)$$

When expressions (14), (15) are substituted to expressions (9) to (12) to calculate tan 2θ, expression (16) is obtained, and the magnetic pole position can be estimated by expression (17).

$$\tan 2\theta = \frac{\sin 2\theta}{\cos 2\theta} = \frac{|i'_{cfc\beta}|_{peak} - |i'_{cfc\alpha}|_{peak}}{|i_{cfc\beta}|_{peak} - |i_{cfc\alpha}|_{peak}} \qquad (16)$$

$$\theta = \frac{1}{2}\tan^{-1}\left(\frac{|i'_{cfc\beta}|_{peak} - |i'_{cfc\alpha}|_{peak}}{|i_{cfc\beta}|_{peak} - |i_{cfc\alpha}|_{peak}}\right) \qquad (17)$$

Therefore, the power factor cos(Δϕ), the coefficients due to the inductances, and the offset value are eliminated. When the voltage in the sampling time is dealt as a fixed value, the inductances can be calculated by using only the carrier frequency component currents which are converted to the coordinates, respectively. The calculations are conducted by using the peak values of the currents at the timing. When averaging is conducted while obtaining absolute values of current values sampled in respective axes in the carrier frequency in place of instantaneous values of the high-frequency currents, therefore, the peak values can be extracted, so that the magnetic pole position can be correctly estimated.

In this example, the magnetic pole position is estimated on the basis of current values in a stationary coordinate system having four axes. However, it should be noted that this magnetic pole estimating method can be similarly applied to a rotating coordinate system (γ–δ, γ'–δ') such as presented in claim 3.

FIG. 5 is a block diagram illustrating the magnetic pole position/speed estimating apparatus.

A band-pass filter (BPF) 1-4-1 extracts high-frequency currents of the same frequency band as the generated carrier signals, from the detected currents. A current coordinate converter 1-4-2 converts the extracted high-frequency currents to two-phase currents in a two-phase stationary coordinate system in which one of three-phase stator windings UVW is α-axis and an axis intersecting the axis at 90 deg. is β-axis, and similarly the high-frequency currents to two-phase currents in a two-phase stationary coordinate system in which the phase is similarly shifted by 45 deg. from the two-phase stationary coordinate system, or in which an axis that is shifted by 45 deg. from the α-axis is α'-axis and an axis intersecting the axis at 90 deg. is β'-axis.

An average calculator 1-4-3 averages the high-frequency currents in the four axes in the carrier frequency, so that their maximum values can be extracted. In the example, the moving average method is used. It is experimentally known that, in the T1 zone, at least two or more current detections are required. A low-pass filter (LPF) 1-4-4 removes noise components from the extracted maximum current values. Finally, the calculation of expression (17) is implemented to estimate the position of the magnetic pole.

When the position of the magnetic pole is estimated, the speed can be estimated from the estimated value. The estimated magnetic flux position is differentiated by a differentiator 1-4-5, and then passed through a low-pass filter (LPF) 1-4-6, thereby estimating the speed ω.

Next, the magnetic pole position estimation in the T2 zone shown in FIG. 3 will be described.

In the T2 zone, the changeover switch 1-3-4 sets the T1 side to be turned OFF, and the T2 side to be turned ON. T1 or T2 is counted by the timer 1-3-3. As shown in FIG. 3, the carrier wave in the T2 zone is single. The high-frequency voltage components included between the output terminals of the inverter can be expressed by following expression (18):

$$\begin{bmatrix} u_{cfcu} \\ u_{cfcv} \\ u_{cfcw} \end{bmatrix} = \begin{bmatrix} -\frac{2E}{\pi}\cos\left(\frac{\pi u_{ref}}{2E}\right)\sin(\omega_h t) \\ -\frac{2E}{\pi}\cos\left(\frac{\pi V_{ref}}{2E}\right)\sin(\omega_h t) \\ -\frac{2E}{\pi}\cos\left(\frac{\pi w_{ref}}{2E}\right)\sin(\omega_h t) \end{bmatrix} \quad (18)$$

In the T2 zone, usual triangular wave modulation is conducted, and the three-phase voltage command values and the single triangular wave are compared with each other. As shown in expression (18), therefore, high-frequency voltage components of the same phase are obtained. Consequently, the voltage high-frequency voltages between phases are canceled out, and hence high-frequency currents are not produced. Therefore, it is impossible to estimate the magnetic pole position in the T2 zone. In the T2 zone, accordingly, the magnetic pole position which is estimated in the T1 zone is used. When the T2 zone is longer, the power loss and magnetic noises due to high-frequency currents are reduced in theory, but the accuracy of magnetic flux position estimation is impaired. When T1 and T2 are set in consideration of the application usage, however, it is possible to averagely adjust high-frequency current components which cannot be adjusted in the conventional art.

While the invention has been described in detail with reference to a specific embodiment, it will be understood by those skilled in the art that various changes and modifications can be made without departing from the spirit and scope of the invention.

This application is based on a Japanese patent application (No. 2002-291261) filed Oct. 3, 2002, and the contents of the patent application are incorporated herein by reference.

INDUSTRIAL APPLICABILITY

As described above, according to the invention, an arbitrary phase difference is produced in PWM inverter carrier signals between two of three or UVW phases to generate voltages and currents of carrier frequency components other than the driving frequency, and the position is estimated by using the carrier frequency component currents. In the conventional art, there is a problem in that the amplitudes of high-frequency currents cannot be adjusted, and the power loss and noises are increased. In a PWM output, three-phase carriers having an arbitrary phase difference between phases are switched to a single-phase carrier, and a time period of implementation is adjusted, thereby attaining an effect that the problems, i.e., adjustment of the amplitudes of high-frequency currents, and reduction of a power loss and magnetic noises are enabled, and the accuracy of magnetic flux position estimation is improved.

The invention claimed is:

1. An apparatus for estimating a magnetic pole position of a motor for a controlling apparatus for driving a motor by a voltage source PWM inverter, and controlling a torque, torque and speed, or torque, speed, and position of the motor, wherein said apparatus comprises: means for switching over first means for producing an arbitrary phase difference in PWM carrier signals between respective two phases of three phases, and second means for causing the phase difference between the two phases to become zero;

means for extracting high-frequency currents in a same frequency band as carrier signals generated by it, from detected currents; and means for estimating a magnetic pole position by using the extracted high-frequency currents.

2. An apparatus for estimating a magnetic pole position of a motor according to claim 1, wherein said means for estimating a magnetic pole position by using the extracted high-frequency currents comprises:

means for extracting the high-frequency currents from respective phase currents of the three phases of said motor; means for converting the high-frequency currents to two-phase currents in a two-phase stationary coordinate system in which one of three-phase stator windings UVW is α-axis and an axis intersecting the α-axis at 90 deg. is β-axis; means for converting the high-frequency currents to two-phase currents in a two-phase stationary coordinate system in which a phase is similarly shifted by 45 deg. from said two-phase stationary coordinate system, or in which an axis that is shifted by 45 deg. from the α-axis is α'-axis and an axis intersecting the α'-axis at 90 deg. is β'-axis; and means for averaging the high-frequency currents in the four axes with a carrier frequency to calculate respective maximum values, and estimates the magnetic pole position on a basis of the calculated maximum values in the four axes.

3. An apparatus for estimating a magnetic pole position of a motor according tp claim 2, wherein
said means for estimating a magnetic pole position by using the extracted high-frequency currents is executed during an implementing time period of said first means for producing an arbitrary phase difference in the PWM carrier signals between respective two phases of three phases is implemented, and, during an implementing time period of said second means for causing the phase difference between two phases of three or to become zero, is stopped, and uses a magnetic pole position estimated by said first means.

4. An apparatus for estimating a magnetic pole position of a motor according to claim 2, wherein
said means for estimating a magnetic pole position by using the extracted high-frequency currents is always implemented irrespective of implementing time periods of said first means for producing an arbitrary phase difference in the PWM carrier signals between respective two phases of three phases, and said second means for causing the phase difference between two phases of three or to become zero,
comprises means for moving averaging the high-frequency currents in the four axes with a carrier frequency to calculate respective maximum values, and estimates the magnetic pole position on the basis of the calculated maximum values in the four axes.

5. An apparatus for estimating a magnetic pole position of a motor according to claim 2, wherein
the high-frequency currents of the $\alpha'$- and $\beta'$-axes are calculated from the high-frequency currents of the $\alpha$- and $\beta$-axes.

6. An apparatus for estimating a magnetic pole position of a motor according to claim 1, wherein
said means for estimating a magnetic pole position by using the extracted high-frequency currents comprises:
means for extracting the high-frequency currents from respective phase currents of the three phases of said motor; means for converting the high-frequency currents to two-phase currents in a two-phase stationary coordinate system in which one of three-phase stator windings UVW is $\alpha$-axis and an axis intersecting the $\alpha$-axis at 90 deg. is $\beta$-axis; means for conducting conversion from the two-phase currents by using a magnetic pole estimated value in a two-phase rotating coordinate system in which $\gamma$-axis is in a same direction as the magnetic pole position, and an axis intersecting $\gamma$-the axis at 90 deg. is $\delta$-axis;
means for convening the high-frequency currents to two-phase currents in a coordinate system in which a phase is similarly shifted by 45 deg. from said two-phase rotating coordinate system, such that a two-phase rotating coordinate system in which an axis that is shifted by 45 deg. from the $\gamma$-axis is $\gamma$-axis and an axis intersecting the $\delta$-axis at 90 dog. is $\delta'$-axis; and means for averaging the high-frequency currents in the four axes wit a carrier frequency to calculate respective maximum values, and
estimates the magnetic pole position on a basis of the calculated maximum values in the four axes.

7. An apparatus for estimating a magnetic pole position of a motor according to claim 6, wherein
said means for estimating a magnetic pole position by using the extracted high-frequency currents is executed during an implementing time period of said first means for producing an arbitrary phase difference in PWM carrier signals between respective two phases of three phases is implemented, and, during an implementing time period of said second means for causing the phase difference between two phases such as of three phases to become zero, is stopped, and uses a magnetic pole position estimated by said first means.

8. An apparatus for estimating a magnetic pole position of a motor according to claim 6, wherein
said means for estimating a magnetic pole position by using the extracted high-frequency currents is always implemented irrespective of implementing time periods of said first means for producing an arbitrary phase difference in the PWM carrier signals between respective two phases such of three phases, and said second means for causing the phase difference between two phases of three phases to become zero,
comprises means for moving averaging the high-frequency currents in the four axes with a carrier frequency to calculate respective maximum values, and estimates the magnetic pole position on the basis of the calculated maximum values in the four axes.

9. An apparatus for estimating a magnetic pole position of a motor according to claim 6, wherein
the high-frequency currents of the $\gamma'$- and $\delta'$-axes are calculated from the high-frequency currents of the $\gamma$- and $\delta$-axes.

10. An apparatus for estimating a magnetic pole position of a motor according to claim 1, wherein
at least two or more currents are estimated during one carrier period.

11. An apparatus for estimating a magnetic pole position of a motor according to claim 1, wherein
the arbitrary phase difference is 120 deg.

12. An apparatus for estimating a magnetic pole position of a motor according to claim 1, wherein
implementing time periods of said first means and said second means in said means for switching over said first means for producing an arbitrary phase difference in PWM carrier signals between respective two phases of three, and said second means for causing the phase difference between the two phases to become zero are set for purposes of adjusting amplitudes of generated high-frequency currents, and reducing a power loss.

13. An apparatus for estimating a magnetic pole position of a motor according to claim 1, wherein
said means for switching over said first means for producing an arbitrary phase difference in PWM carrier signals between respective two phases of three phases, and said second means for causing the phase difference between two phases of three phases to become zero comprises means for adjusting implementing time periods of said first means and said second means in accordance with a state of a load.

14. A controlling apparatus wherein said apparatus has a current controlling apparatus which splits an estimated current into a pole direction component and a torque component by using the magnetic pole position estimated by the apparatus for estimating a magnetic pole position according to claim 1, feeds back the components to obtain differences between the pole direction component and the torque component, and respect to current command values, and implements a current control so that the differences become zero.

15. A controlling apparatus wherein said apparatus has a speed estimating apparatus which estimates a speed by using the magnetic pole position estimated by the apparatus for estimating a magnetic pole position according to claim 1.

16. A controlling apparatus wherein said apparatus has a speed controlling apparatus which feeds back the speed estimated on the basis of the speed estimating apparatus according to claim 15, to obtain a difference with respect to a speed command value, and implements a speed control so that the difference becomes zero.

17. A controlling apparatus wherein said apparatus has a position controlling apparatus which feeds back a rotor position estimated value which obtained on the basis of the magnetic pole position estimated by the apparatus for estimating a magnetic pole position according to claim 1, to obtain a difference with respect to a rotor position command value, and implements a position control so that the difference becomes zero.

18. A controlling apparatus wherein said apparatus has a torque controlling apparatus for a motor comprising the apparatus for estimating a magnetic pole position according to claim 1, or the current controlling apparatus according to claim 14.

19. A controlling apparatus wherein said apparatus has a speed controlling apparatus for a motor comprising the apparatus for estimating a magnetic pole position according to claim 1, or the current controlling apparatus according to claim 14, the speed estimating apparatus according to claim 15, or the speed controlling apparatus according to claim 16.

20. A controlling apparatus wherein said apparatus has a position controlling apparatus for a motor comprising the apparatus for estimating pole position according to claim 1, or the current controlling apparatus according to claim 14, or the speed estimating apparatus according to claim 15, or the speed controlling apparatus according to claim 16, or the position controlling apparatus according to claim 17.

* * * * *